US012682350B2

(12) United States Patent
Azgad-Tromer et al.

(10) Patent No.: US 12,682,350 B2
(45) Date of Patent: Jul. 14, 2026

(54) IDENTITY CONVEYANCE SYSTEMS

(71) Applicant: SEALANCE CORP., Miami, FL (US)

(72) Inventors: Shlomit Azgad-Tromer, Miami, FL (US); Matthew Green, Miami, FL (US); Eran Tromer, Miami, FL (US)

(73) Assignee: Sealance Corp., Miami, FL (US)

( * ) Notice: Subject to any disclaimer, the term of this patent is extended or adjusted under 35 U.S.C. 154(b) by 141 days.

(21) Appl. No.: 18/547,450

(22) PCT Filed: Feb. 23, 2022

(86) PCT No.: PCT/US2022/017445
§ 371 (c)(1),
(2) Date: Aug. 22, 2023

(87) PCT Pub. No.: WO2022/182706
PCT Pub. Date: Sep. 1, 2022

(65) Prior Publication Data
US 2024/0135380 A1 Apr. 25, 2024

Related U.S. Application Data

(60) Provisional application No. 63/152,655, filed on Feb. 23, 2021.

(51) Int. Cl.
G06Q 20/40 (2012.01)
(52) U.S. Cl.
CPC ..... G06Q 20/4014 (2013.01); G06Q 2220/00 (2013.01)
(58) Field of Classification Search
CPC ...................... G06Q 20/4014; G06Q 2220/00
See application file for complete search history.

(56) References Cited

U.S. PATENT DOCUMENTS

| | | | |
|---|---|---|---|
| 5,659,616 A | 8/1997 | Sudia | |
| 5,857,022 A | 1/1999 | Sudia | |

(Continued)

FOREIGN PATENT DOCUMENTS

| | | | |
|---|---|---|---|
| JP | 2001-132554 A | 5/2001 | |
| JP | 2005-530382 A | 10/2005 | |

(Continued)

OTHER PUBLICATIONS

Eleanor Birrell, et al., Federated Identity Management Systems: A Privacy-Based Characterization, Sep. 1, 2013, IEEE, pp. 36-48 (Year: 2013).*

(Continued)

*Primary Examiner* — Nilesh B Khatri
(74) *Attorney, Agent, or Firm* — Hamilton, Brook, Smith & Reynolds, P.C.

(57) ABSTRACT

A system configured to facilitate verification of a customer's identity to a financial service provider by issuing an identity assertion to the service provider is provided. The system comprises an identity provider configured to store customer information and to verify the customer's identity, and to generate the identity assertion asserting at least some of the information based on a request from the service provider, the assertion comprising an encrypted portion; and a customer identity manager associated with the customer and configured to communicate with the service provider and the identity provider to facilitate providing the assertion to the service provider. The system further comprises an identity summarization engine configured to reason over a customer record and a policy in order to selectively determine which information in the customer record is to be provided in the assertion to the service provider, and in what form.

19 Claims, 2 Drawing Sheets

(56)  References Cited

U.S. PATENT DOCUMENTS

| | | | |
|---|---|---|---|
| 6,009,177 | A | 12/1999 | Sudia |
| 7,711,625 | B2 | 5/2010 | Markel et al. |
| 7,904,722 | B2 | 3/2011 | Sudia et al. |
| 8,108,307 | B1 | 1/2012 | Kawan et al. |
| 8,577,795 | B2 | 11/2013 | Clubb et al. |
| 8,789,040 | B1 | 7/2014 | Callary |
| 9,419,951 | B1 | 8/2016 | Felsher et al. |
| 10,007,714 | B2 | 6/2018 | Rajagopalan et al. |
| 10,348,693 | B2 | 7/2019 | Auradkar et al. |
| 12,155,781 | B1 | 11/2024 | Helfgott et al. |
| 2002/0095355 | A1 | 7/2002 | Walker et al. |
| 2002/0143673 | A1 | 10/2002 | Hitchings et al. |
| 2003/0051171 | A1* | 3/2003 | Pearson ................. G06Q 30/02 726/4 |
| 2004/0153407 | A1 | 8/2004 | Clubb et al. |
| 2005/0096944 | A1 | 5/2005 | Ryan |
| 2006/0089159 | A1 | 4/2006 | Liu |
| 2006/0173759 | A1 | 8/2006 | Green et al. |
| 2006/0259420 | A1 | 11/2006 | Schaffer et al. |
| 2007/0244778 | A1 | 10/2007 | Bailard |
| 2008/0071651 | A1 | 3/2008 | Markel et al. |
| 2008/0189286 | A1 | 8/2008 | Choi et al. |
| 2008/0301788 | A1 | 12/2008 | Yoakum |
| 2009/0116643 | A1 | 5/2009 | Hatano et al. |
| 2009/0217034 | A1 | 8/2009 | Sudia et al. |
| 2009/0217368 | A1* | 8/2009 | Buss ....................... G06F 21/34 726/9 |
| 2010/0100926 | A1* | 4/2010 | Binding .................. G06F 21/41 726/1 |
| 2010/0217994 | A1 | 8/2010 | Ginter et al. |
| 2010/0299243 | A1 | 11/2010 | Chiulli et al. |
| 2011/0013771 | A1* | 1/2011 | Camenisch .......... H04L 9/3252 380/46 |
| 2013/0046675 | A1 | 2/2013 | Chiulli et al. |
| 2013/0103602 | A1 | 4/2013 | Melnick et al. |
| 2013/0138563 | A1 | 5/2013 | Gilder et al. |
| 2013/0179314 | A1 | 7/2013 | Stoke et al. |
| 2014/0058947 | A1 | 2/2014 | Schnoerer et al. |
| 2014/0143126 | A1 | 5/2014 | Malik |
| 2014/0244801 | A1 | 8/2014 | Bhatnagar et al. |
| 2015/0073821 | A1 | 3/2015 | Ladd et al. |
| 2015/0073822 | A1 | 3/2015 | Cagnetta et al. |
| 2015/0170287 | A1 | 6/2015 | Tirone et al. |
| 2016/0012541 | A1 | 1/2016 | Harrington et al. |
| 2016/0109954 | A1 | 4/2016 | Harris et al. |
| 2016/0203488 | A1 | 7/2016 | Guerrero et al. |
| 2016/0259835 | A1 | 9/2016 | Rajagopalan et al. |
| 2017/0232300 | A1 | 8/2017 | Tran et al. |
| 2017/0270285 | A1 | 9/2017 | Spence |
| 2018/0167220 | A1 | 6/2018 | Levy et al. |
| 2018/0183586 | A1 | 6/2018 | Bhargav-Spantzel et al. |
| 2018/0254907 | A1* | 9/2018 | Gasparini ............. H04L 9/3255 |
| 2018/0343265 | A1 | 11/2018 | Mcmillan et al. |
| 2019/0147415 | A1 | 5/2019 | Peikert et al. |
| 2019/0164151 | A1 | 5/2019 | Doney et al. |
| 2019/0164153 | A1 | 5/2019 | Agrawal et al. |
| 2019/0205881 | A1 | 7/2019 | Borzilleri et al. |
| 2019/0207928 | A1* | 7/2019 | Bhargava ............ H04L 63/0815 |
| 2019/0207942 | A1 | 7/2019 | Roth et al. |
| 2019/0333054 | A1 | 10/2019 | Cona et al. |
| 2019/0394052 | A1 | 12/2019 | Li et al. |
| 2020/0219181 | A1 | 7/2020 | Kasower |
| 2020/0252408 | A1 | 8/2020 | Bankston et al. |
| 2020/0280855 | A1* | 9/2020 | Avetisov ................. H04L 63/20 |
| 2021/0173962 | A1* | 6/2021 | Sarkar ..................... G06F 21/64 |
| 2021/0256508 | A1* | 8/2021 | Moy .................. G06Q 20/3674 |
| 2021/0304200 | A1 | 9/2021 | Doney et al. |
| 2021/0320799 | A1* | 10/2021 | Bankston .............. H04L 9/3239 |
| 2021/0358054 | A1 | 11/2021 | Tavares et al. |
| 2022/0020018 | A1 | 1/2022 | Jivanyan et al. |
| 2022/0076253 | A1 | 3/2022 | Chaum |
| 2022/0239500 | A1 | 7/2022 | Wahab et al. |
| 2022/0321360 | A1 | 10/2022 | Wahab et al. |
| 2022/0337427 | A1 | 10/2022 | Doiron et al. |
| 2022/0345312 | A1 | 10/2022 | Larmuseau |
| 2022/0405838 | A1* | 12/2022 | Slowiak .................. G06F 21/31 |
| 2024/0095728 | A1 | 3/2024 | Agrawal et al. |
| 2024/0104521 | A1 | 3/2024 | Azgad-Tromer et al. |
| 2024/0177187 | A1 | 5/2024 | Ortiz et al. |
| 2024/0184898 | A1 | 6/2024 | Ortiz et al. |
| 2024/0249001 | A1 | 7/2024 | Ortiz et al. |
| 2024/0333510 | A1 | 10/2024 | Ortiz et al. |

FOREIGN PATENT DOCUMENTS

| | | |
|---|---|---|
| JP | 2005-339308 A | 12/2005 |
| JP | 2006-285490 A | 10/2006 |
| JP | 2008-524741 A | 7/2008 |
| JP | 2009-181194 A | 8/2009 |
| JP | 2009-199573 A | 9/2009 |
| JP | 2019-175002 A | 10/2019 |
| JP | 2020-535543 A | 12/2020 |
| WO | 2022/159854 A1 | 7/2022 |

OTHER PUBLICATIONS

International Search Report from PCT/US2022/017445 dated Jun. 21, 2022.

International Search Report from PCT/US2022/013601 dated Apr. 1, 2022.

* cited by examiner

Request

Policy

Customer Data

Identity Summarization Engine

Response

Cooperating Identity Provider

Cooperating Identity Provider

Service Provider

Cooperating Identity Provider

Cooperating Identity Provider

IDENTITY CONVEYANCE SYSTEMS

CROSS-REFERENCE TO RELATE APPLICATIONS

This application is a National Phase Application of PCT International Application No.: PCT/US2022/017445, International Filing Date Feb. 23, 2022, claiming the benefit of U.S. Provisional Patent Application No. 63/152,655, filed Feb. 23, 2021, which are hereby incorporated by reference.

TECHNOLOGICAL FIELD

The presently disclosed subject matter relates to digital asset systems, and in particular to identification of customers using such systems.

BACKGROUND

Compliance with Know Your Customer (KYC) regulations poses a major technical challenge for Virtual Asset Service Providers (VASPs) such as cryptocurrency exchanges, for financial institutions, for decentralized financial applications, and for other service providers in the space of digital currencies and assets ("providers"). In many regulatory regimes, each provider must validate the identity of every customer that it performs financial transactions with. This identity may comprise a number of different forms of data, each with specific verification procedures. For example, KYC regulations in the United States require VASPs to obtain customer name and address information, and to verify identity documents and photographs of individuals. Various additional information may be obtained and verified, such as income, net worth, or source of funds. Regulations may also require providers to associate this identity with additional information that may later be developed about the customer, such as reputation scores and records of potentially fraudulent activity. Moreover, both regulations and business needs may require that providers exchange information about customers with regulators and with other providers.

Existing technological approaches make this regulatory compliance challenging. First, in the current regime, each individual provider must create the digital and human infrastructure to verify KYC documentation, and must then record and store the resulting sensitive data securely according to local data security standards. The need to manage this process "in house" imposes costs on providers, and adds overhead and delays to the process of acquiring new customers. Second, the standards used by different providers to verify identification documents may differ, resulting in identity information of inconsistent quality. Third, in cases where multiple providers interact with a single customer, providers may need to uniquely identify a customer in order to exchange information about that customer's activity with other providers: this is challenging to do when providers each use different standards for recording customer identity (for example, matching customer accounts by name can lead to cases of mistaken identity or identity theft.) Finally, compliance with regulations may require providers to store large amounts of sensitive information about individual customers, and/or to share sensitive and confidential customer information with other providers. The need for customers to store large amounts of sensitive identity information with each provider places customers at risk of harm due to the risk of data breaches, and exposes providers to the risk of civil and criminal liability.

SUMMARY

According to some aspects, there is provided an electronic financial platform to facilitate electronic transmission of financial, legal, and/or business information among customers, businesses, law enforcement agencies, regulators, virtual asset service providers, financial institutions, and other parties, without an intermediary. This information may comprise, inter alia, transactions, identity verification, and other reports. Information including identity verification requirements and status may be shared within the network securely in a fully encrypted manner. Moreover, the platform may ensure that information is only visible to parties authorized to see it.

According to some aspects, there is provided a system configured to facilitate one or more identity providers to receive, verify, and record customer identity information, and to share portions of this information with service providers in a manner that minimizes the need for service providers to store sensitive customer information. Further provided is a system which facilitates customer authorization and control of the dissemination of specific portions of their identity information and/or pseudonyms to chosen providers. The system further may further be configured to enable the dissemination of this information from an identity provider in a manner that allows a service provider to verify its authenticity, for example without the service provider communicating directly with the identity provider. This may be enabled by providing customers with a cryptographic identity certificate and/or identity assertion. (In the present disclosure and appended claims, the terms "certificate" and "assertion," as well as associated terms, will be used interchangeably, unless otherwise clear from context.)

The system may further be configured to facilitate defining, by service providers, requirements for required identity information, and for identity providers to meet these requirements, and to request retention of specific customer information by identity providers. It may further allow service providers to compare customer identifiers and to share information about specific customers with identity providers and with other service providers, such that this information is bound to the customer's identity.

According to some examples, the system may be configured to operate in a centralized configuration, in which information about a customer's identity is stored at a centralized identity provider. Service providers interact directly with the centralized identity provider using secure and authenticated network communication channels in order to obtain assertions about customer identity and to send back updated information about the customer's behavior.

According to some examples, the system may be configured to operate in a decentralized configuration, in which information about a customer's identity is provided to the customer in a cryptographically authenticated form, wherein the service provider receives a subset of this information from the customer. Updates from the service provider may be stored in various locations, including at the identity provider, with the customer (for distribution to other service providers), and/or on a consensus network ledger such as a blockchain.

According to some examples, the system may be configured to operate according to a combination of features of each of the centralized configuration and of the decentralized configuration.

According to some aspects of the presently disclosed subject matter, there is provided a system configured to facilitate verification of a customer's identity to a financial service provider by issuing an identity assertion to the service provider, the system comprising:

an identity provider configured to store customer information and to verify the customer's identity, and to generate the identity assertion asserting at least some of the information based on a request from the service provider, the assertion comprising an encrypted portion; and a customer identity manager associated with the customer and configured to communicate with the service provider and the identity provider to facilitate providing the assertion to the service provider;

the system further comprising an identity summarization engine configured to reason over a customer record and a policy in order to selectively determine which information in the customer record is to be provided in the assertion to the service provider, and in what form.

The system may be provided according to any one or more of the following embodiments (unless otherwise clear from context, examples of each embodiment are non-limiting, i.e., all combinations thereof constitute part of the present disclosure):

EMBODIMENT 1: The identity summarization engine may define a request language defining a common format for identity requests from a service provider, and a common format for the assertions issued to the service provider.

EMBODIMENT 2: The identity summarization engine may be configured to determine that at least some of the information from the customer record be included in the assertion in a generalized form. According to some non-limiting examples, this embodiment further includes Embodiment 1 above.

EMBODIMENT 3: The identity summarization engine may be configured to determine that at least some of the information from the customer record be included in the assertion in a combined form with other information from the customer record. According to some non-limiting examples, this embodiment further includes any of the above embodiments.

EMBODIMENT 4: The identity summarization engine may be configured to determine, based on the identity of the service provider, that at least some of the information from the customer record be withheld. According to some non-limiting examples, this embodiment further includes any of the above embodiments.

EMBODIMENT 5: The identity summarization engine may be implemented by the identity provider. According to some non-limiting examples, this embodiment further includes any of the above embodiments.

EMBODIMENT 6: The identity provider may be configured to issue the assertion directly to the service provider.

According to non-limiting examples of Embodiment 6, the customer identity manager may be configured to receive a request from a service provider to provide an identity assertion, and provide the service provider with information identifying one or more identity providers from which a suitable identity assertion may be obtained. The information identifying the one or more identity providers may comprise a zero-knowledge proof identifying the one or more identity providers.

According to some non-limiting examples, Embodiment 6 further includes any of the above embodiments.

EMBODIMENT 7: The customer identity manager may be configured to provide the assertion, issued by the identity provider, to the service provider.

According to non-limiting examples of Embodiment 7, the customer identity manager may be further configured to provide additional information, available to the customer, to the service provider. The customer identity manager may be configured to provide the additional information summarized using a zero-knowledge proof.

According to some non-limiting examples, Embodiment 7 further includes any of the above embodiments.

EMBODIMENT 8: The identity summarization engine may be implemented by the customer identity manager. According to some non-limiting examples, Embodiment 8 further includes any of the above embodiments.

EMBODIMENT 9: The system may comprise a plurality of cooperating identity providers, wherein a plurality of the cooperating identity providers each issues a component assertion of at least a portion of information required by the service provider, thereby facilitating providing an aggregated assertion of the component assertions.

According to non-limiting examples of Embodiment 9, at least some of the component assertions may comprise assertions of information not asserted in other of the component assertions.

According to non-limiting examples of Embodiment 9, at least some of the component assertions comprise assertions of information asserted in other of the component assertions.

According to some non-limiting examples, Embodiment 9 further includes any of the above embodiments.

EMBODIMENT 10: The identity provider may be configured to receive information from the service provider about the user, and update the assertion in view thereof.

According to non-limiting examples of Embodiment 10, the updating may comprise revoking at least some of the information in the assertion.

According to non-limiting examples of Embodiment 10, the identity provider is configured to publish a message to the service provider that an updated assertion is available.

According to some non-limiting examples, Embodiment 10 further includes any of the above embodiments.

EMBODIMENT 11: The assertion may comprise reporting information configured to facilitate the service provider to report information about the customer to an external system.

According to non-limiting examples of Embodiment 11, the reporting information may comprise one or more authentication tokens and/or information identifying one or more locations for reporting the information.

According to some non-limiting examples, Embodiment 11 further includes any of the above embodiments.

EMBODIMENT 12: The assertion may comprise an expiry date. According to some non-limiting examples, Embodiment 12 further includes any of the above embodiments.

EMBODIMENT 13: The customer information comprises non-identity data. According to some non-limiting examples, Embodiment 13 further includes any of the above embodiments.

EMBODIMENT 14: The customer identity manager may be integrated with a digital wallet associated with the customer. According to some non-limiting examples, Embodiment 14 further includes any of the above embodiments.

EMBODIMENT 15: The encrypted portion of the assertion may implement a zero-knowledge proof. According to some non-limiting examples, Embodiment 15 further includes any of the above embodiments.

EMBODIMENT 16: The assertion may comprise a non-encrypted portion.

According to non-limiting examples of Embodiment 16, the encrypted portion may comprise cryptographic authentication data computed over at least some of the non-encrypted portion.

According to some non-limiting examples, Embodiment 16 further includes any of the above embodiments.

Accordingly, the system according to the presently disclosed subject matter may allow providers to outsource the task of performing, e.g., KYC identity verification to dedicated third parties, so that providers can easily onboard new customers without performing expensive and time-consuming duplicate work. Moreover, the system provides customers with a digital identity that can be used across multiple providers, so that providers can exchange information about a single customer without the risk of mis-identifying the customer. To prevent abuse, the system may facilitate selective exchange of information and identity under the control of customers and regulators. Moreover, in order to ensure information security, the system may allow for minimizing the dissemination of critical information to providers, without preventing providers from complying with regulations.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

System Components

According to the presently disclosed subject matter, there is provided a system configured to facilitate one or more identity providers to receive, verify, and record customer identity information, and to share at least a portion of this information with service providers such that the need for service providers to store sensitive customer information is minimized.

The system may be configured to operate in with, or as part of, a compliance system which is configured to manage transactions over a digital asset network, for example as described in PCT/US2022/13601, filed Jan. 25, 2022, the full contents of which are incorporated herein by reference. The system of the presently disclosed subject matter may constitute an identity conveyance system of such a compliance system.

Figure 1:
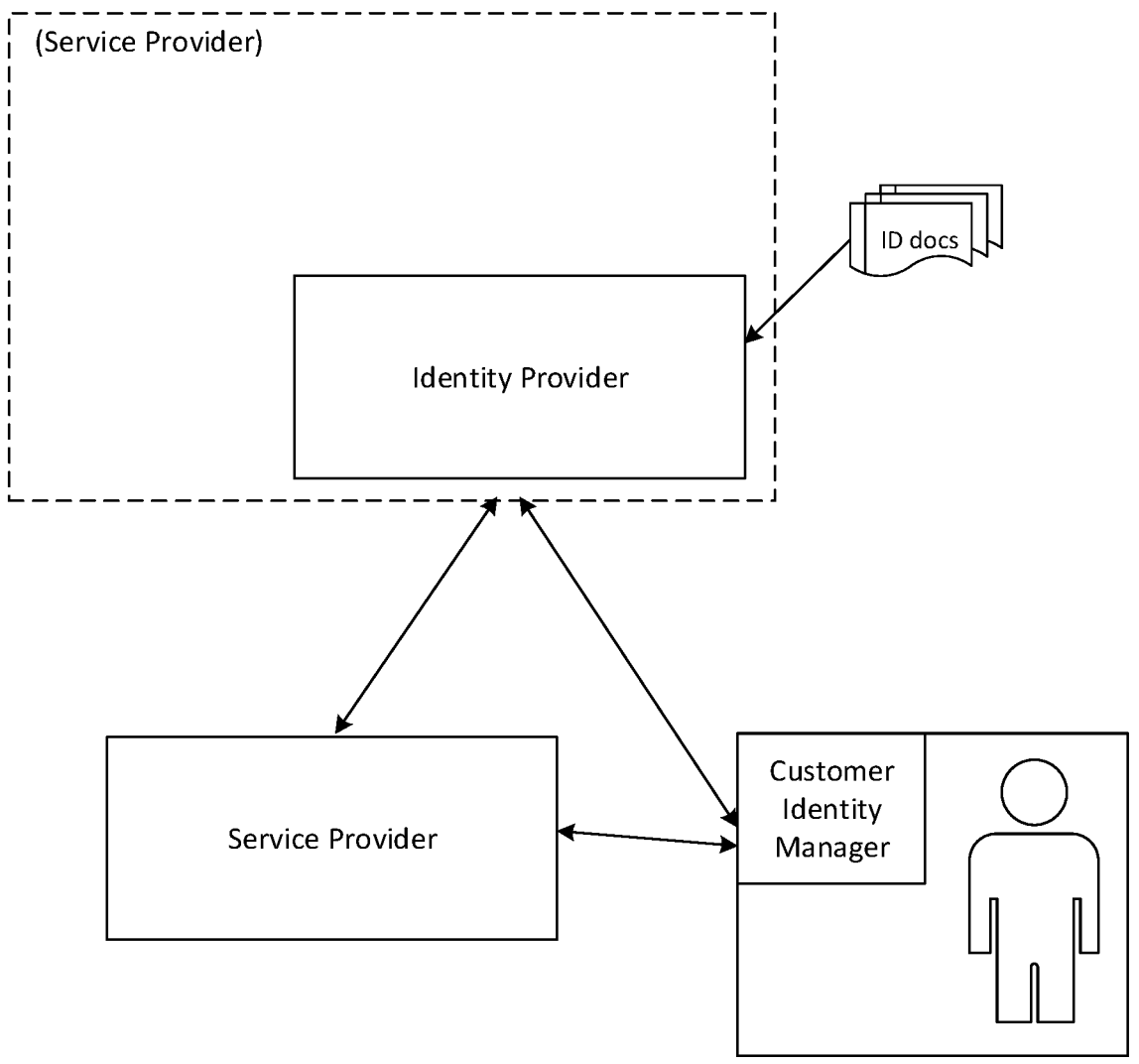
FIG. 1 illustrates a system according to the presently disclosed subject matter for facilitating verification of a customer identity to a service provider.

The system may be configured to make assertions about a customer's identity, wherein the customer owns and/or controls one or more digital assets. As illustrated in FIG. 1, the system comprises an identity provider, a service provider, and may further comprise one or more customer identity managers, which are configured to communicate with each other, for example over a computer network.

The identity provider (IP) is configured to verify customer identity credentials such as government-issued identification documents, and to securely record information about each customer. The IP may be further configured to issue identity assertions to service providers. Such identity assertions may be in the form of digital certificates, and are configured to inform a service provider about identity information, or the existence of identity information at the IP, regarding the customer, in a manner such that the service provider can itself verify.

The service provider (SP) is configured to provide one or more financial services to a customer. Examples of SPs may include, but are not limited to, a centralized finance (CeFi) exchange, Virtual Asset Service Providers (VASPs), banks, payment processors merchants, credit card issuers, and fund transmission services. An SP may require identity verification in order to perform a transaction with specific customers, and may be configured to receive identity assertions from a trusted identity provider. An SP may be configured to interact with one or more SPs to exchange information about customers, and/or to verify that different SPs are interacting with the same customer.

According to some examples, the service provider provides a decentralized finance (DeFi) instrument. For example, the SP may comprise a "smart contract" available on a public ledger. Accordingly, for example, a DeFi instrument which implements the system of the presently disclosed subject matter, and thus can demonstrate that it can verify the identities of its users, may be trusted by a centralized finance institution for use by its customers.

The customer identity manager (CIM) is configured to allow a customer to interface with service providers and identity providers. An instance of a CIM may be integrated as a subcomponent of a customer "wallet" configured to control and store digital assets such as cryptocurrency. The CIM is in communication with a computer network, thereby allowing it to send and/or receive messages from the IP and SP systems. The CIM software or hardware may be directly controlled by a customer, and/or may be operated by a service provider on behalf of customers. According to some examples, the CIM is integrated with a wallet which is implemented on dedicated device (a so-called "hardware wallet") which is only intermittently connected to the internet, for example by connecting to a general-purpose computer to the internet. According to some examples, the CIM in integrated with a wallet which is software-based, i.e., implemented on software installed on a general-purpose computer which is continuously connected to the internet. According to some examples, a CIM is partially integrated with a hardware wallet, and partially integrated with a software-based wallet.

There may be multiple instances of each of these components in a given system, and these components are communicatively coupled through a computer network to exchange information among one another.

It will be appreciated that the terms IP, SP, and CIM are descriptive of a given set of functionalities, and thus a party may concurrently serve as an IP, SP, and/or CIM. For example, an entity which is configured both to provide one or more financial services to a customer and to verify customer identity credentials may be described herein as an identity provider when it is functioning to issue identity assertions to service provider. Accordingly, the identity provider is illustrated in FIG. 1 as constituting part of another service provider (which is indicated in parentheses to distinguish it from the SP interacting with the IP).

System Operation

During operation, the system performs one or more functions, a non-limiting list of which follows.

Identity Verification

In order to establish an identity in the system, the customer communicates with an identity provider to convey identity documentation, which is verified by the IP. The document verification may be performed, e.g., in person at a physical location, electronically via a computer network, and/or in any other suitable way or combination thereof. One example of such a process may include, but is not limited to, uploading a photograph of a government-issued identification, one or more bills addressed to the customer, etc., to a website. Identity verification may comprise digital procedures such as direct digital communication with government agencies, and/or the use of digital identity documents contained on "smart cards."

Once the identity provider has verified the customer's identity, it may generate and issue to the customer a digital identity credential. This is a digital file that contains structured information about the customer's identity, as well as cryptographic authentication data such as digital signatures computed over this information, using cryptographic keys generated by the identity provider. According to some examples, the IP may store the identity information locally.

Service Registration

When a customer wishes to register with a new service provider (e.g., an SP with which he has not previously registered, and therefore which cannot currently verify the customer's identity), it contacts the service provider through a network connection, such as an HTTP(S) request made to a website or via a mobile app. The customer may indicate with which identity provider it has previously registered, for example by specifying information about its identity. This information may include a subset of the information stored within an identity certificate held by the customer, as well as cryptographic information derived from the identity certificate. Alternatively, the customer may facilitate initiating a direct communication between the identity provider and service provider, possibly mediated by the customer's computer.

In this process, the customer may reveal a single, specific identity provider. Alternatively, the customer may reveal that the identity provider belongs to an authorized set of identity providers, without revealing the specific identity provider. The latter may be done using cryptographic zero-knowledge proofs that refer, for instance, to a list of certified identity providers within the jurisdiction, or to a digital signature certificate issued by a jurisdictional authority that certified the identity provider. Moreover, the customer may reveal a plurality of identity providers, such that the separate information that they provide about the customer can be complementary and checked for consistency.

At the conclusion of this process, the service provider obtains relevant information about the customer, thereby verifying that the customer is registered with the identity provider and holds an identity in good standing. This information may be associated with the customer's account at the service provider. The information recorded by the service provider may at least partially derive from a combination of information requested by the SP and information that the IP and customer choose to reveal. According to some examples, this information may reveal complete identity information, such as a customer's name. According to other examples, the information conveyed will include a pseudonym, i.e., an identifier for the customer that differs from the customer's actual identity. The pseudonym is chosen such that it uniquely identifies the customer to the identity provider. It may be chosen such that each customer has a single pseudonym shared across multiple SPs it registers with, or an individual pseudonym that is specific to a single provider.

The information thus learned by the service provider may convey attributes of the customer's identity as summaries at coarse granularity, without revealing precise details or supporting evidence. For example, it may reveal the customer's country of citizenship or residence (but not specific address), their age range (but not precise age or birthday), their income range, and/or their net worth range. The identity may also be of negative nature, e.g., that the customer's citizenship is not in a certain deny-list while not disclosing the specific country of citizenship.

Information may be requested by service providers for a variety of purposes, including, but not limited to, compliance with money transmitter, Virtual Asset Service Provider, securities, and/or banking regulations. For example, the requested information may be used to comply with Know Your Customer (KYC), anti-money laundering, counter-terrorism financing and sanctions mandates, to comply with Travel Rule mandates, to ascertain Accredited Investor status (e.g., income, net worth as per Regulation D of the United States Securities and Exchange Act of 1933), to comply with the United States Foreign Account Tax Compliance Act (FATCA), and/or to comply with the United States Fair and Accurate Credit Transactions Act (FACTA), all of which require collection and verification of customer information. The information may also be requested by the service provider in order to decide account limits or features for the customer (e.g., option trading, margin, or other leverage), and/or to be used as data for custom risk-based policies.

Service Provider Reporting

Once the service provider has received a customer's identity information from the service provider, it can perform services on behalf of the customer. The nature of these services may be dependent on the specific nature of the provider. The SP may record information that it wishes to associate with the customer's identity. For example, the SP may store information that it only needs locally in its internal database. Moreover, the SP may obtain information that is of interest to other parties in the system. Examples of this information may include, but is not limited to, reports of fraudulent behavior by customers (e.g., "Suspicious Activity Reports"), which may need to be conveyed to regulatory authorities or other parties in the system, or information that could convey useful information about a customers' activity on chain.

To facilitate this recording, the SP may transmit information to the identity provider and/or to other parties that can be usefully combined with identity information. This may be accomplished in a number of ways described further below.

Identity Revocation and Updates

Parties in the system may provide updates to the identity information held by SPs, and/or revoke an identity assertion previously made. The former may occur when customer information changes at the IP, and this requires new and updated information to be transmitted to the SP. Alternatively, the IP may need to revoke a customer's identity rights with one or more service providers. This may occur when, for example, a customer's identity information is found to have been accessed fraudulently to register with a service provider. To facilitate this, IPs may from time to time transmit one or more revocation messages to the SPs, either via broadcast messaging or via dedicated messages transmitted thereto. These revocation messages are configured to ensure that the SP will recognize that identity assertions previously made to an SP should no longer be accepted as valid. The mechanisms for this process are described in detail further below.

Technical and Implementation Considerations

The mechanisms described above may be realized in two different configurations. In a centralized configuration, the identity provider (which may include, e.g., associated servers authorized by the IP) communicates with the service provider(s) in real time to convey identity assertions. A benefit of this approach is that it can be realized using any one or more of many existing web-based technologies such as HTTP, HTTPS, REST APIs, HTML, web cookies, etc. In a decentralized configuration, the IP transmits a cryptographic object to the customer's customer identity manager, which stores this value and can make assertions about its identity directly to SPs. These configurations need not be mutually exclusive, e.g., a decentralized configuration may include communication between the SP and the IP.

Common Elements

In each of the configurations, the identity provider maintains a database that comprises records about customers and their accounts. The records may include, but are not limited to, information such as customer names, addresses, citizenship, passport details, national identity numbers, digital currency addresses, supporting documentation and verification procedures performed on the individual, customer transaction history, credit scores, source of funds, etc. The identity provider may also be configured to summarize some portions of this information into alternative forms, e.g., converting a collection of transaction history data into a "risk score" that provides service providers with a snapshot evaluation of the customer's activity.

The IP may further be configured to communicate with a computer network, thereby accessing one or more consensus networks, such as blockchain-based systems (e.g., Bitcoin, Ethereum, etc.). It may use this access to collect additional information about the customer. The IP may also interact through the computer network with customer machines, customer identity managers, service providers, and/or other connected components. (A person of ordinary skill in the art will understand that the identity provider may itself divide these functions across multiple computers or locations.)

Each identity provider and one or more service providers may establish a trust relationship. This relationship requires that the service provider determine that the IP as a source of authentic identity information. Service providers may establish trust relationships with multiple identity providers, and these trust relationships may be conditioned on specific elements of the identity, e.g., a service provider may trust an identity provider to validate identities for a specific jurisdiction, but not for other jurisdictions (e.g., it may validate an identity for the United States, but not for France.) The trust relationship may also apply in the reverse direction, e.g., an IP may only support assertions to specific SPs identified in advance, or it may support assertions to any SP.

This trust may be established between individual pairs of identity providers and service providers, or it may employ a system that marks a plurality of identity providers and/or service providers as trustworthy, for instance, via a list of certified identity providers within a jurisdiction, or via a digital signature certificate issued by a jurisdictional authority.

Centralized Configuration

In the centralized configuration, the identity provider communicates with the SP in real time, either directly via the communication network or using the customer's computer as an intermediary, for example as described below.

A customer may establish a new relationship with a specific service provider, and/or may perform an action at a SP that necessitates identity verification. In such a case, the SP and IP may communicate with each other (directly or indirectly) to exchange specific information. This may include, but is not limited to, the following:

1. The SP indicates to the IP specifically what identity information is required. This may include a general description indicating that all available information is required, or that a subset of the identity information is required. A mechanism for specifying this information is described below.

2. The IP determines whether or not the SP is authorized to receive information about identity, and which data it should receive. This determination process may involve policies local to the IP, including the existence of trust relationships between the IP and the SP. It may also involve a step in which the customer is required to provide explicit authorization for the transfer of information. The decisions about which data to deliver to the SP is made by a component called the identity summarization engine, which will be described below.

3. The IP delivers information about the customer's identity to the SP. This may comprise a transmission involving a data structure that encodes the identity information into fields. Each field may contain one aspect of the customer's identity information, with all fields bound together as belonging to the same customer. This data structure shall also incorporate a customer identifier value. The IP may also deliver auxiliary records it has received, such as updated risk information from other SPs that is intended for delivery.

At least some of the information delivered by the IP to the SP is in the form of an assertion, i.e., the information itself is not transmitted to the SP, and remains with the IP. The assertions allow an SP to rely on the IP regarding the existence of the information, without having access to the information itself.

4. At a later point, the SP may develop information about a customer (e.g., information about a fraudulent transaction, or updated risk scoring information). At this point, the SP may report information to the IP that can be further used to augment the IP's knowledge about the customer. This information may be stored in the database at the IP, and/or may be stored by a third party using an identifier that is bound to the customer's identity.

The IP may be configured to identify at least a subset of the customer's identity information for delivery to the SP. It will be appreciated that herein present disclosure and appended claims, the term "subset" may include a portion (i.e., a subset in the literal sense of the word) of the identity fields in the database (i.e., some fields are selectively delivered, and some are withheld), and/or the information provided in a generalized form that provides reduced granularity. For example, a field in the IP database may specify the exact birthdate of the customer; however, the IP may instead deliver an approximate date or age (e.g., "the customer is over 21") instead of this exact data. The IP may further be configured to generate a pseudonym in place of explicit identifying customer information. This may be a customer identifier or number that is unique for this customer between the IP and this SP.

The information delivered to the customer and exchanged with the SP may be delivered in a manner that is secure against unauthorized tampering and/or eavesdropping by intermediaries. This may be accomplished by establishing a secure channel between the SP and IP using the Transport Layer Security (TLS) protocol, which provides encrypted and cryptographically authenticated communications between two machines over an Internet Protocol connection. However, alternative mechanisms may be used as well: for example, the identity provider may deliver information to the SP through the use of web-based redirects and other standard web technologies, provided this information is cryptographically authenticated in order to prevent tampering. A person of ordinary skill in the art will recognize many common techniques for such communications exist, including the JSON Web Tokens standard.

The IP may be thus configured to deliver customer identity information securely to the SP while ensuring that confidentiality and authenticity are maintained, and that only necessary customer identification information is revealed to the SP. The IP also establishes a customer-unique identifier with the SP so that further communications regarding this customer can be uniquely referenced as part of the IP/SP communication.

A variant of the above mechanism, which will be familiar to one of ordinary skill in the art, is that instead of transmitting messages directly between the IP and SP, the IP and SP may exchange messages using the customer's computer (e.g., a web browser) as an intermediary to pass messages between the two. The use of such an intermediary communications mechanism is a common approach in web-based systems such as Single Sign-On systems.

Decentralized Configuration

The decentralized configuration of the system does not require real-time communication between the identity provider and service provider to authenticate each customer. Instead, the customer is provided with a cryptographic certificate that embeds relevant identity information. This certificate may be stored by the customer in a customer identity module (CIM). According to some examples, a portion of the certificate (e.g., a public portion and/or a commitment/hash of the certificate) may be stored on a public ledger such as a blockchain. The customer identity module may be configured to communicate with the service provider and identity provider via a computer network. When a service provider requires authentication of a customer's identity, it interacts with the CIM to obtain an identity assertion, i.e., a cryptographic object that specifies information about the customer's identity in a cryptographically authenticated manner, for example as described below.

A customer may establish a new relationship with a specific service provider, or may perform an action at a SP that necessitates identity verification. When this occurs, the SP and CIM will communicate (directly or indirectly via a second computer) to exchange specific information. This may include, but is not limited to, the following:

1. The SP indicates to the CIM specifically what identity information is requested. This may include a general description indicating that all available information is required, or that a subset of the identity information is required. This information request may be done via dedicated communication from the SP, or it may be announced a priori by the SP. In particular, the information request may be attached to an SP's virtual wallet address, thereby notifying would-be customers that all fund transfers involving this virtual wallet are subject to providing the specific requested information.

2. The CIM determines whether or not the SP is authorized to receive information about identity, and which data it should receive. This determination process may involve policies local to the CIM as well as some policies that are defined by the IP and stored in the customer's identity certificate. It may also involve a step in which the customer is required to provide explicit authorization for the transfer of information. The decisions about which data to deliver to the SP is made by a modified variant of the identity summarization engine that is located within the CIM in this configuration.

3. The CIM delivers information about the customer's identity to the SP. This delivery may consist of a transmission involving a data structure that encodes the identity information into fields. Each field may contain one aspect of the customer's identity information, with all fields bound together as belonging to the same customer. This data structure shall also incorporate a customer identifier value. To ensure that this information is authentic, the CIM may also attach a cryptographic proof (and/or signature) formulated based on the identity certificate. This proof can be verified by the SP to ensure that the information is authentic. Optionally the proof may demonstrate that the selective disclosure identified by the identity summarization engine was correctly formulated with respect to a particular IP policy. At least some of the information delivered by the CIM to the SP is in the form of an assertion, i.e., the information itself is not transmitted to the SP, and remains with the CIM. The assertions allow an SP to rely on the CIM regarding the existence of the information, without having access to the information itself.

4. The SP may use the information provided by the CIM to optionally request other information about a customer, such as updated information about customer risk scores. This information may be stored at a public location (e.g., posted to a blockchain or stored on a publicly accessible data storage system) or it may be obtained from a private service such as the original IP. The identity and location of this service may be provided to the SP by the CIM as part of the information delivered in step (3), along any customer identifiers and access codes needed to obtain this information.

5. At a later point, the SP may develop new information about a customer (e.g., information about a fraudulent transaction, or updated risk scoring information). At this point, the SP may report information that can be further used to augment the known information about the customer. This information will be sent to a location identified in the previous step (e.g., a public storage location or a private storage location such as the IP). It is bound to a customer identifier at this location. As a further element protecting this data, it may be encrypted when stored at a public location. The necessary decryption keys for this data may be included in the identity certificate and delivered to the SP from the CIM as part of step (3).

As described above with reference to the centralized configuration, the CIM, with input from the IP, may be configured to identify a subset of the customer's identity information for delivery to the SP. The CIM or IP may also generate a pseudonym in place of explicit identifying customer information. This may be a customer identifier or number that is unique for this customer between the IP and this SP.

As the IP is not necessarily involved in every identity assertion, cryptographic techniques may be provided so that the CIM can assert to the SP useful information about the customer's identity, even though the CIM is wholly under the control of the customer (who may be untrustworthy to the SP). To accomplish this, the CIM may be configured to implement one or more cryptographic techniques, e.g., from the field of anonymous credentials and zero-knowledge proofs, to produce a "non-interactive proof of correctness" over each identity assertion. This proof, which is a digital object, is generated by the CIM using the identity certificate and other local key material as input, and can be verified by the SP. Once the proof is verified, the SP can be assured that the information included in the identity assertion is authentic (that is, it represents a true summarization of the authenticated data in the identity certificate). This may ensure that even a compromised CIM cannot issue false identity assertions to the SP. As described below, the identity provider may be configured to revoke an identity certificate associated with a customer, and/or to revise such a certificate with updated information.

The decentralized setting may further support information reporting by the SP. The information provided by the SP may be similar to the reporting described above. However, the mechanism by which reporting happens can be different. In one embodiment, the SP can report information to the IP directly (as in the centralized setting), and receive updates directly from the IP. However, in other embodiments, the SP may report information to an external system, such as a public or private storage entity, e.g., blockchains, file sharing services, and/or other third parties that merely hold data for delivery to other customers. To enable this, the identity certificate may contain authentication tokens and the locations for reporting data, so SPs can exchange data via these services. The data reported by the SP may also be encrypted under a cryptographic key specified to the SP by the CIM identity assertion, and reports received by the SP from other SPs may be decrypted using the same cryptographic key (or a related one). This mechanism is described in detail further below.

As the CIM is located at the customer's machine, it may also have access to additional information about the customer's transactions that is not available to the IP. For example, if the CIM is present in the customer's digital "wallet" it may have access to a full list of all past transactions, including recipient information and amounts. The CIM may be configured to incorporate this information into the assertions that it makes to the SP. For example, a CIM may be configured to assert that some transactions have been issued to a specific SP as proof that the customer has an existing relationship with the SP. This information may be provided explicitly (e.g., with reference to explicit transactions on a digital currency network) or it may be summarized using privacy-preserving cryptographic techniques. This may be accomplished using a zero-knowledge proof that indicates the existence of a transaction (or transactions) meeting certain criteria on a public-visible cryptocurrency ledger, such as a blockchain. Suitable techniques for computing such proofs are well-known in the art.
Technical Details
Identity Summarization Engine & Identity Request and Assertion Syntax The system described herein may be configured to selectively disclose information to service providers, in a manner that can minimize the amount of customer Personal Identifiable Information (PII) about customers that is stored with service providers. The decision about which information is disclosed may differ among service providers, e.g., owing to requirements and ability to securely store data among different Service Providers. (Selective disclosure may involve redacting specific fields, as well as altering some identity information into a less specific form, e.g., reducing precise data into categories or summaries.) To ensure that the system can scale to a large number of service providers and customers, the process of selective disclosure may be automated to a large extent.

Figure 2:
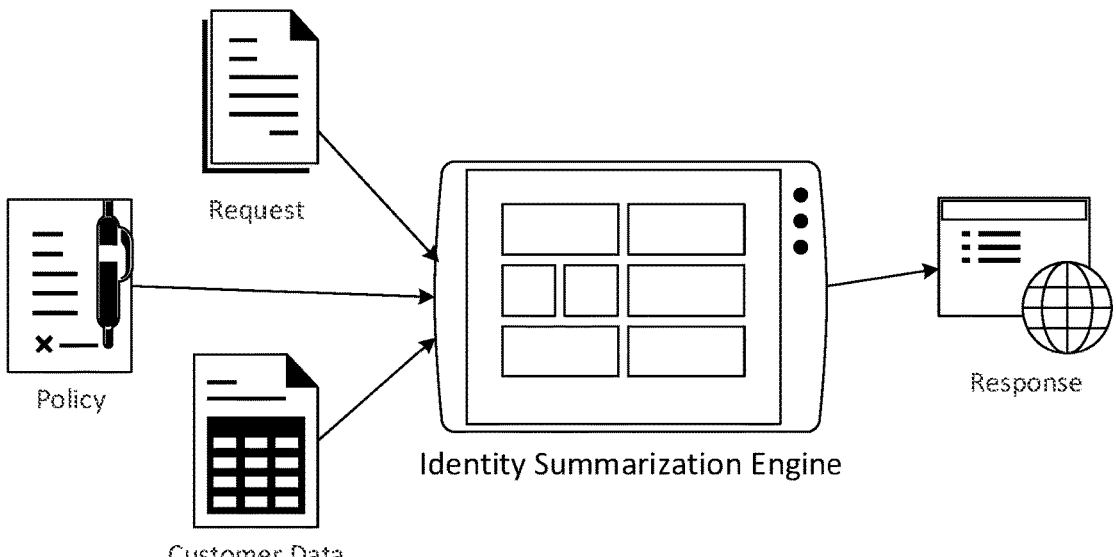
FIG. 2 illustrates an identification summarization engine of the system illustrated in FIG. 1.

To enable this process of automated selective disclosure, an identity summarization engine (ISE) may be provided, for example as illustrated in FIG. 2. The ISE is configured to record one or more customer data records, as well as a request from a service provider detailing what data is needed, and optionally some auxiliary information such as identity policies. According to some examples, the auxiliary information may relate to non-identity data, e.g., those relating to activity of the customer and/or the account, including, but not limited to, transaction history related to the account, customer activity not related to the account (e.g., those recorded on the blockchain and/or by a service provider), source of funds, etc. The ISE then determines which customer data should be selectively disclosed to the SP, either by selecting specific fields from the customer data or by providing a subset of the customer data, e.g., in a form that is accurate but less specific. An ISE may be operated by the identity provider directly (e.g., in the centralized setting) or it may be deployed as part of the CIM.
Operation of the ISE In operation, the ISE receives as input a request from a SP (either directly from the SP, or provided by the IP or CIM), a customer record, and a policy (although it may take in additional information as well.) The ISE processes each field of the customer data in order to determine if the field should be delivered to the SP, omitted from the assertion delivered to the SP, or generalized using less specific information. In addition, the ISE may determine that the field should be included in the assertion delivered to the SP (either in its present form, or a subset, i.e., a portion or generalization, thereof), in combination with information from one or more other fields. The operation of the ISE on each field may depend on a policy, which may dictate, e.g., which information should be delivered, summarized, or withheld, and/or which should be combined, for example on an SP-specific basis.

The information used by the ISE may vary between implementations. For example, the SP request may contain detailed information about what fields the SP requires, or it may contain no such details. The policy may be expressed in a general-purpose computer programming or scripting language, that encodes rules for processing each field, and may be Turing-complete. Alternatively, it may simply describe a more restricted set of rules that can be interpreted by a data processing system to determine which action to take with each field.
Identity Request and Assertion Language In order to realize the ISE, the system according to some examples may specify a request language for specifying identity requests from SPs as well as identity assertions made to SPs. The request language specifies which identity fields the SP requires and at what granularity, in a machine-readable format (e.g., a JSON-like format). For example, the SP may specify a tuple of required fields such as:

required_fields={full_name,age,investor_status,le-
        gal_jurisdiction} wherein each of the above token names represents a standard piece of information stored within the customer record. Additionally, the SP may identify that specific fields can be delivered in summarized form. For example, an SP request may indicate that it only requests to know "whether the customer is over 21 years of age". This can be expressed in a number of possible formats. The SP may also identify when an identity field can be treated as optional, or replaced with a placeholder (e.g., a pseudonym in place of a customer name). For example:

```
required_fields={full_name,age:{>=21},investor_sta-
    tus,legal_jurisdiction={!="EU"}}
``` may indicate that the SP is requesting only to know that the customer is at least 21 years of age, and that the customer is explicitly not in the "EU" jurisdiction.

Any request may be processed by the ISE in order to determine whether this information can be delivered to the SP, and (if allowed) each necessary field can be extracted from the customer data record and delivered to the SP. The response message is expressed in an assertion language, i.e., a machine-readable format that contains the requested data, and may moreover contain customer identifiers and fields for facilitating updates. For example:

```
{
    "Customer_id", 92348723483,
    "full_name": "Arthur Wallace Peterson",
    "age": 43,
    "investor_status": "accredited",
    "legal_jurisdiction: "US",
    "update_location": "https://identity-provider.com/updates"
    "update_token": "932hbc0wehraehamsnebkaadk2efsvds2bzkhbjWz"
}
```

The assertion language message may include components in response to specific requests (e.g., specifying customer data records). It may also include standard elements such as the ability to identify when information fields have been redacted or summarized. For example, the following response might indicate a summarization that is responsive to the second query described above, and also indicates that the investor_status component of the record has been redacted due to a policy limitation:

```
{
    "Customer_id", 92348723483,
    "full_name": "Arthur Wallace Peterson",
    "age"[>=21]: TRUE,
    "investor_status": {null, not_available_with_policy},
    "legal_jurisdiction"[!=EU]: TRUE,
    "update_location": "https://identity-provider.com/updates"
    "update_token": "932hbc0wehraehamsnebkaadk2efsvds2bzkhbjWz"
}
```

The above examples are one of what a request and response language might look like. A full implementation might use a different notation, e.g., for interoperability with standard conventions, or for compactness.

As illustrated above, an identity assertion may also include a location at which updated information and customer revocation information may be found. This may be identified by a URL, and may also contain identifiers such as authorization tokens (e.g., passwords) and decryption keys that are needed in order to access data and decrypt retrieved information.

Policies

In addition to the SP request and customer data, the ISE may be configured to take as input one or more policies selected by the identity provider. These policies, together with the SP request, allow the ISE to determine which fields should be returned and which should be summarized or redacted. As discussed above, the policies may comprise computer programs or scripts that can operate over the elements of the SP request and customer data, and/or make determinations about how to output or summarize data. Alternatively, policies can simply specify basic rules that the ISE can evaluate against this data in order to make decisions.

It will be appreciated that while the policies are described above as operating over the full SP request and customer data, they may also reason over partial customer data. For example, customer data may contain only the names of the fields in the customer record, and the ISE can output instructions on which fields should be summarized or omitted.

Cryptographic Authentication

In order to accept a new identity assertion, the SP must ensure that the assertion is authentic. This implies two things: (1) that the identity assertion is consistent with information held by the identity provider, and optionally (2) that the specific decisions about which information to send, omit and summarize are authorized by the identity provider.

Centralized Setting

In the centralized setting, the IP and SP communicate in real time, either directly or using the customer's computer as an intermediary. In this setting, cryptographic authentication is handled in various ways:

1. For direct communication between the SP and the IP, the two parties can use the Transport Layer Security protocol (formerly known as SSL). This protocol provides one-sided or mutual authentication of the two parties using digital certificates, and establishes an encrypted and authenticated connection between the two. An SP that initiates such a connection directly to the IP can verify the authenticity of all data received over the connection, including identity assertions, because the cryptographic protocol ensures that the connection is valid, and that the data received is authentic, e.g., protected against modification or data insertion by third parties.

2. For indirect communication between the SP and the IP, the two parties can employ digital signatures or Message Authentication Codes to authenticate messages delivered between from the IP to the SP. These values can be delivered e.g., via JWT tokens or URLs. A number of practical solutions to delivering encrypted and authenticated information between two systems via an intermediary's web browser are known in the literature.

It will be appreciated that as identity assertions derive directly from the identity provider in this setting, any time the SP can verify that an assertion is authentic, the SP may also be configured to verify that the summarization of the identity information was also determined by the IP. This may obviate the need to provide a further cryptographic mechanism to prove to the SP that this is true.

Decentralized Setting

In this setting, the IP provides the customer (specifically, the customer identity manager component) with an identity certificate that contains relevant details about the customer's identity. The CIM must then make identity assertions to the SP that the SP can verify as authentic.

According to some examples, an identity assertion from the CIM to the SP is made by transmitting the entire identity certificate from the CIM to the SP without any selective disclosure or summarization of fields. In this setting, the identity certificate may contain a digital signature over its contents formulated by the identity provider. Upon receiving the identity certificate, the SP can verify that the certificate is valid (i.e., produced by the IP) by verifying that the signature is valid with respect to the IP's public key. (It will be appreciated that a digital signature is a cryptographic object analogous to a real signature, in that it proves the authenticity of a document. Regarding a digital signature, a signing party [in this case the IP] holds a secret key that can make a signature on any message [the identity certificate data] such that this signature can be verified as authentic using a second, related "public key" issued to all parties by the IP.)

According to some examples, the system is configured to allow selective disclosure while allowing the SP to verify authenticity.

According to some examples in which selective disclosure while allowing the SP to verify authenticity is allowed, the IP is configured to compute a digital commitment to each data field, and then to combine all of the commitment values and signs the combined result. The identity certificate comprises the full list of digital commitments along with signature, and the CIM is also given the plaintext list of data fields and commitment "opening" values for each field. When the CIM transmits an identity assertion to the SP, it transmits the full identity certificate comprising the commitments and signature, along with the data fields themselves along with "opening" values for all commitments corresponding to data fields that it wishes to reveal to the SP. The SP can then verify the signature is valid, and that each data field and opening value is consistent with the corresponding commitment. (A digital commitment is a cryptographic object that resembles an envelope. To make a commitment, a data field is provided as input, along with some optional random data, and the result is an object called a commitment that does not reveal the contents of the data field, as well as an "opening" value. Given the commitment, the opening value, and the contents, any party can verify that the commitment is consistent. A key property of commitments is that once formulated, a commitment should not be feasible to "open" to a different data value than it was formulated with)

According to these examples, the CIM may be configured to selectively reveal data fields to the SP. For those fields the CIM wishes to selectively reveal, it may be configured to provide the data field and commitment opening (in addition to the commitment contained in the identity certificate). For those the CIM does not wish to reveal, it omits the data field and commitment opening. The SP can then be assured that all selectively revealed values are consistent and authentic with the identity certificate, but the SP does not learn any values that the CIM chooses not to reveal.

It will be appreciated that a number of variants of this structure, which may be more efficient, are possible. For example, the IP may elect to compute a Merkle hash tree over tree over all of the commitments, which may be included at the leaves of a hash tree, and reveal portions of the hash tree in order to satisfy the SP that all revealed values are correct. The CIM may transmit some portions of the Merkle hash tree for values it wishes to reveal. According to this approach, the amount of data transmitted to the SP may be sublinear in the number of fields in the identity certificate.

The approach above may facilitate selective disclosure of fields in the identity certificate. In order to provide summarization, a cryptographic method that enables the CIM to reveal a mathematical function of one or more fields in the identity certificate without revealing the original values in the certificate may be, and to convince the SP that this function was computed correctly, may be provided. For example, a mathematical function might take as input the age of a customer, and output "TRUE" if the customer is over 21 years of age. Other functions might translate customer information into less-precise representations e.g., by "bucketing" information or otherwise summarizing it.

An alternative embodiment of the decentralized setting uses "anonymous credential" techniques to allow for the CIM to create identity assertions. A series of cryptographic techniques are known for making cryptographic assertions over structured authenticated documents. In this paradigm, a central "authority" cryptographically signs a document called a "credential" that contains information, for example comprising multiple fields. This credential may be signed directly by the authority and given to a customer, or it may be signed using a "blind signature" in such a way that a person who possesses the credential information can interact with the authority to obtain a signature on this credential, without the authority learning any (or some) information on the credential. Subsequently, the customer holding the signed document can generate assertions over specific contents of the credential: for example, the customer can "show" the credential by producing cryptographic messages that indicate a proof to some third party (called a "verifier") that they possess such a credential, or that the credential contains specific information. This verifier party may be the same party as the original authority, or the verifier may be a third party. Such "anonymous credentials" may ensure that the credential "show" messages are not easily linked back to the original credential signed by the authority. Thus, if an authority has signed many credentials and subsequently sees the "show" messages for a credential, it should not be able to determine which of these credentials is being shown. Similarly, it should not be feasible for a customer to "show" a credential that they were not issued by the authority, without this fraudulent activity being detected by the verifier. Suitable anonymous credentials are well-known in the art.

A more powerful variant of anonymous credentials use "signatures with efficient protocols," which are also well-known in the art. This variant defines a signature scheme that can sign a multi-field anonymous credential, and allows the customer to prove arbitrary functions over the signed data. For example, a customer who holds a signed credential can simply reveal a field of the credential, can omit a field of the credential, or can publish a zero-knowledge proof of knowledge that they have input fields from a signed credential that satisfy some mathematical function. This mathematical function can be a summarization function that maps input fields to a summarized input. The nature of this process is that a "credential show" can reveal a summarization of one or more fields of the credential, and prove that the customer performing the show has a credential that is consistent with this summarization. These signatures can be realized from signatures based on the Strong RSA assumption, bilinear maps, and other cryptographic techniques.

According to some examples, the decentralized setting uses such an anonymous credential as follows. To obtain an identity certificate, the CIM obtains an anonymous credential over the customer's identity information. This signed information may be stored in a multi-field anonymous credential and delivered to the CIM using a blind signature extraction protocol, or simply by having the IP sign the credential and deliver it to the CIM. When the SP requires an identity assertion from the CIM, the ISE system on the CIM now evaluates a policy that is also stored in the CIM, and determines precisely which fields of the certificate should be revealed to the SP and which should be summarized. For those fields which should be summarized, the CIM now derives a mathematical summarization function over the fields of the certificate and outputs the summarized value. Finally, it computes a credential "show," which is a cryptographic message that proves that the revealed summarization is consistent with the signed certificate.

One example of summarization is to develop a pseudonym for a customer that is unique to each exchange. An identity certificate should contain a customer identifier that is specific to the identity provider. However, the IP and CIM may not wish to reveal this unique identity information to the SP, but my instead wish to generate a "pseudo-identifier" for each SP. To handle this case, the CIM may be configured to employ a summarization function that "entangles" the customer identifier with an SP-specific identifier to obtain a pseudo-ID that is specific to the SP. This summarization function may be, for example, a function such as a pseudo-random function in which the key is the customer identifier, and the input to the function is the unique identifier of the SP.

Reporting

As mentioned above, an SP may be configured to produce additional information that must be stored at the identity provider and/or distributed to other service providers. Such information may include, but is not limited to, information about fraudulent transactions produced by a customer, or new information about a customer's activity. This information may be intended for delivery to all participants in the system, or it may be restricted to specific parties.

As discussed above, in both the centralized and decentralized settings, information may be reported by transmitting it directly to the identity provider. This can be accomplished by delivering a reporting location (e.g., a URL) to the SP as part of the identity certificate. This URL may be associated with one or more API keys or authentication tokens, which allow access. To report new information, the SP establishes communication with the IP and transmits information in a secure manner, e.g., via an HTTP(S) connection. This information is then recorded into a database by the identity provider, and may be processed for later delivery to other customers and SPs.

According to some examples, for example when the system operates according to the decentralized setting, this information may be delivered to other SPs via a broadcast channel or storage system. One such channel is the use of a consensus network such as a blockchain.

Multiple Identity Providers

Figure 3:
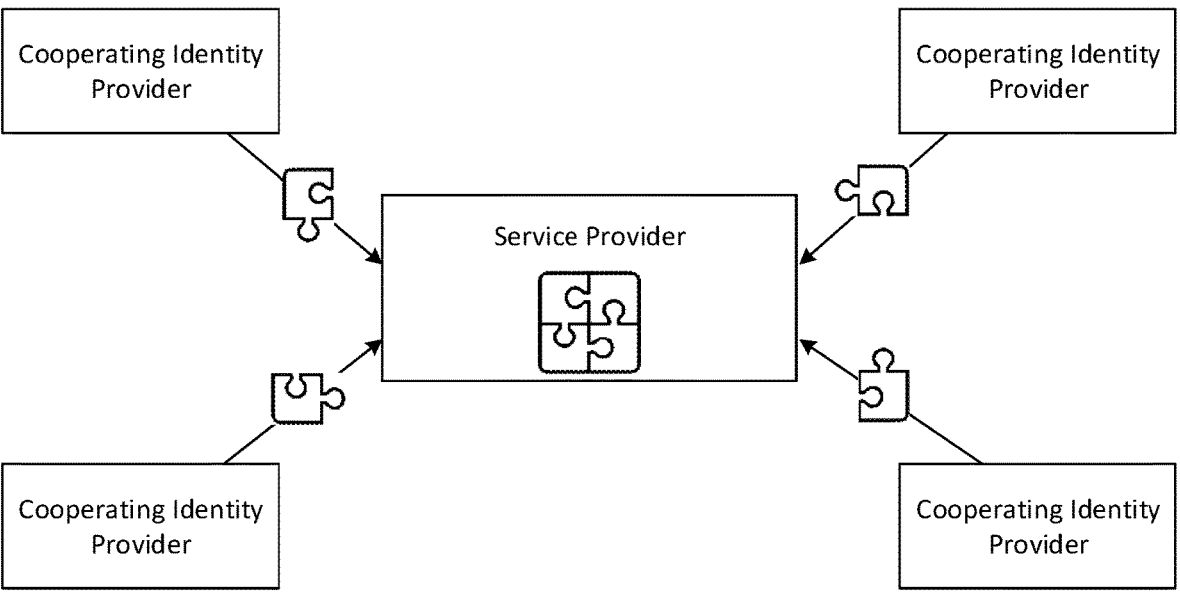
FIG. 3 illustrates an example of the system illustrated in FIG. 1, in which an aggregated identity aggregated identity assertion is provided.

In some embodiments, a single identity provider may not be solely responsible for carrying a customer's identity information and/or storing reported information. For example, as illustrated schematically in FIG. 3, a customer's identity information might be divided across several cooperating identity providers that work in concert to provide an aggregated identity assertion. (It will be appreciated that the term "cooperating" is used herein the present disclosure and appended claims to describe the cooperating role played by such IPs, i.e., each providing part of the required assertion, with the collective assertions provided thereby encompassing all of the information required by the SP; in practice, cooperating IPs do not necessarily communicate with one another.) This mechanism can be realized by establishing a unique customer identifier across all providers, wherein each provider produces a component identity assertion or identity certificate that contains relevant information held by that identity provider. These can be aggregated, e.g., according to the customer identifier, in order to provide a complete assertion at the SP, or a complete set of information for use as an identity certificate at the CIM.

Similarly, information reported by SPs may be stored at multiple distinct locations. Provided that this information is identified by some identifier that allows individual reporting values to be linked together, this information can be obtained by SPs and other interested parties and combined to obtain a complete picture of the necessary reported information.

Moreover, the ability of the system to facilitate aggregation of partial identity assertions/certificates allows a service provider to be selective regarding to what extent it relies on a particular IP, and for what information. For example, an SP may rely on a first IP for the age of a customer, but requires verification of investor status (e.g., because its policy requires this information be asserted by two different sources, because the policy defines the first IP to be unqualified to make this assertion for example based on a risk-tolerance level, etc.). Accordingly, the SP may request information from a second IP to augment the information asserted by the first IP. This information may comprise the same information asserted by the first IP, and/or additional information not asserted by the first IP, e.g., because the first IP could not make the necessary assertion, because the SP did not request that information from the first IP, or for any other suitable reason. Accordingly, the ability of the system to allow for aggregation of assertions facilitates an SP to implement an enhanced due diligence when verifying the identity of a customer.

Revocation and Freshness of Certificates

Occasionally, an issued identity certificate or identity assertion may become invalid, or may contain information that has been supplanted by new information that is available to the identity provider. To handle this case, each identity certificate and identity assertion may contain any of the following four fields: an identity for the assertion/certificate, an expiration date for the assertion/certificate, instructions (such as a URL) to use in order to obtain updated information about the assertion/certificate, and a recommendation for how often each certificate should be updated.

In the centralized setting, the SP which receives an assertion from the IP may optionally receive these fields as part of the assertion. The SP can use this information to determine whether an assertion has reached its expiration date through the mechanism of comparing the expiration date to the current time. Similarly, in the decentralized setting the CIM may compare the expiration date to the current time in order to determine whether the identity certificate has expired and must be refreshed. Moreover, in the decentralized setting the CIM may transmit to the SP either (1) the identity certificate expiration date, or (2) a summarization of the identity certificate expiration date, in a form that can be verified as authentic by the SP. Examples of such a summarization may include, but are not limited to, a summary that indicates approximately when the identity certificate expires, or simply an indicator that indicates that, as of the current time, the identity certificate has not yet expired. This may be required in order to ensure that assertions made by the CIM to an SP do not leak the exact expiration date of the certificate, since this information may reveal information to the SP that allows the SP to link different identity assertions by the CIM to the same identity certificate, if this information is supposed to be hidden.

The IP may be configured to revoke and/or update the information in an identity assertion or identity certificate prior to the expiration date. This may occur, for example, when new information arrives at the IP that changes the status of a customer, e.g., a stolen identity certificate or evidence of fraudulent intent. To address this case, the IP may be configured to publish a "revocation" message to one or more SPs that allow the SP to determine that one or more customer identities must be updated. This message may include the assertion or identity certificate identifier.

The identifier associated with the identity assertion received by the SP may be unique for a customer, but shared across all SPs, or it may be a distinct identifier used for each SP/IP combination to identify a single customer, as discussed in previous sections.

A number of protocols exist for the revocation of standard PKI certificates such as those used to secure web sites. These include certificate revocation lists (CRLs) and the online certificate status protocol (OCSP), which are used to signal that a given certificate has been revoked. These protocols can be applied with minor modifications to the identity certificates and assertions described above, or specific protocols with a similar purpose may be used in their place. To use a certificate Revocation List, the identity provider will publish a list containing identifiers of all revoked identity certificates and/or assertions. In the OCSP example, each service provider will periodically contact the identity provider to request whether a given certificate/assertion identifier has been revoked. A final variant of this approach is related to the process of "OCSP stapling," in which a client such as the CIM can contact the IP to obtain a digitally signed file indicating that the identity certificate is still valid and unrevoked. This file contains a "period of validity" indicating when this file should be considered valid for (e.g., up to three days from the time it is requested.) The CIM can then attach, or "staple", the file to the identity assertion made to the SP. Alternatively, the CIM can summarize the contents of this file using the techniques described for identity certificates. This removes the need for the SP to communicate directly with the IP, and removes some resource costs from the SP in checking that a certificate is still valid.

As an alternative to full revocation, an IP may wish to simply update the contents of an identity assertion or identity certificate. The mechanism for this is similar to revocation, except that the IP should indicate as part of the message it publishes (e.g., CRL or OCSP message) that the certificate/assertion has not been revoked: that rather the parties should obtain an updated certificate from the IP. In the centralized setting, the SP will then contact the IP as described in previous sections to obtain a new/updated assertion. In the decentralized setting, the CIM will contact the IP to obtain an updated identity certificate, and the SP may need to obtain a fresh assertion from the CIM.

Those skilled in the art to which this invention pertains will readily appreciate that numerous changes, variations, and modifications can be made without departing from the scope of the presently disclosed subject matter, mutatis mutandis.

The invention claimed is:

1. A computer-based system comprising:
   a processor; and
   a memory with computer code instructions stored thereon, the processor and the memory, with the computer code instructions, being configured to cause the computer-based system to:
      store information associated with a computing node;
      verify an identity of the computing node;
      generate an identity assertion, the identity assertion configured to assert at least a portion of the information associated with the computing node based on a request from a digital asset server, the identity assertion including an encrypted portion;
   transform, using a zero-knowledge proof, an identity object associated with the computing node into a digital object, the digital object including a non-interactive proof, the non-interactive proof capable of being verified by the digital asset server to validate that the identity assertion correctly represents authenticated data in the identity object;
   communicate with the digital asset server and an identity server to facilitate transmitting the identity assertion to the digital asset server;
   reason over a data record and a policy to selectively determine one or more data fields in the data record to be provided in the identity assertion to the digital asset server, and a form of the one or more data fields;
   transform at least one data field of the selectively determined one or more data fields into at least one cryptographic object and at least one cryptographic value;
   configure a given cryptographic object of the at least one cryptographic object to preempt access to contents of a corresponding data field of the at least one data field, the given cryptographic object capable of being verified by the digital asset server based on (i) the given cryptographic object, (ii) a corresponding cryptographic value of the at least one cryptographic value, and (iii) the contents;
   generate a digital signature based on the at least one cryptographic object; and
   transmit the identity object and the at least one cryptographic value to the digital asset server, the identity object including the at least one cryptographic object and the digital signature.

2. The computer-based system of claim 1, wherein the processor and the memory, with the computer code instructions, are further configured to cause the computer-based system to:
   generate a hash tree based on the at least one cryptographic object, the hash tree including at least one leaf node corresponding to the at least one cryptographic object; and
   transmit at least a portion of the hash tree to the digital asset server.

3. The computer-based system of claim 1, wherein the processor and the memory, with the computer code instructions, are further configured to cause the computer-based system to:
   define a request language defining (i) a common format for identity requests from digital asset servers and (ii) a common format for identity assertions issued to the digital asset servers.

4. The computer-based system of claim 1, wherein the processor and the memory, with the computer code instructions, are further configured to cause the computer-based system to:
   determine that at least some of the one or more data fields are to be included in the identity assertion in a generalized form.

5. The computer-based system of claim 1, wherein the processor and the memory, with the computer code instructions, are further configured to cause the computer-based system to:
   determine that at least some of the one or more data fields are to be included in the identity assertion in a combined form with other data fields from the data record.

6. The computer-based system of claim 1, wherein the processor and the memory, with the computer code instructions, are further configured to cause the computer-based system to:

determine, based on an identity of the digital asset server, that at least some of the one or more data fields are to be withheld.

7. The computer-based system of claim 1, wherein the processor and the memory, with the computer code instructions, are further configured to cause the computer-based system to:

issue the identity assertion directly to the digital asset server.

8. The computer-based system of claim 1, wherein the identity assertion is a first identity assertion, wherein the digital asset server is a first digital asset server, and wherein the processor and the memory, with the computer code instructions, are further configured to cause the computer-based system to:

receive a request from a second digital asset server to provide a second identity assertion; and provide the second digital asset server with information identifying one or more identity servers from which a suitable identity assertion may be obtained.

9. The computer-based system of claim 8, wherein the information identifying the one or more identity servers includes a zero-knowledge proof identifying the one or more identity servers.

10. The computer-based system of claim 1, wherein the processor and the memory, with the computer code instructions, are further configured to cause the computer-based system to:

provide additional information, available to the computing node, to the digital asset server.

11. The computer-based system of claim 10, wherein the processor and the memory, with the computer code instructions, are further configured to cause the computer-based system to:

provide the additional information summarized using a zero-knowledge proof.

12. The computer-based system of claim 1, wherein the processor and the memory, with the computer code instructions, are further configured to cause the computer-based system to:

receive information from the digital asset server about a user; and update the identity assertion in view thereof.

13. The computer-based system of claim 12, where, in updating the identity assertion, the processor and the memory, with the computer code instructions, are configured to cause the computer-based system to:

revoke at least a portion of the at least a portion of the information associated with the computing node.

14. The computer-based system of claim 12, where, in updating the identity assertion, the processor and the memory, with the computer code instructions, are configured to cause the computer-based system to:

publish a message to the digital asset server, the message indicating that the updated identity assertion is available.

15. The computer-based system of claim 1, wherein the identity assertion includes information configured to facilitate the digital asset server to report information associated with the computing node to an external system.

16. The computer-based system of claim 15, wherein the information associated with the computing node includes at least one of: (i) one or more authentication tokens and (ii) information identifying one or more locations for reporting the information associated with the computing node.

17. The computer-based system of claim 1, wherein the encrypted portion of the identity assertion implements a zero-knowledge proof.

18. The computer-based system of claim 1, wherein the identity assertion includes a non-encrypted portion.

19. The computer-based system of claim 18, wherein the encrypted portion includes cryptographic authentication data computed over at least some of the non-encrypted portion.

* * * * *